United States Patent
Uchibori et al.

(10) Patent No.: US 10,173,638 B2
(45) Date of Patent: Jan. 8, 2019

(54) ENERGY ABSORBING DEVICE, SEAT BELT RETRACTOR AND SEAT BELT APPARATUS

(71) Applicant: JOYSON SAFETY SYSTEMS JAPAN K.K., Tokyo (JP)

(72) Inventors: Hayato Uchibori, Tokyo (JP); Daichi Nemoto, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 211 days.

(21) Appl. No.: 15/124,943

(22) PCT Filed: Feb. 23, 2015

(86) PCT No.: PCT/JP2015/054955
§ 371 (c)(1),
(2) Date: Sep. 9, 2016

(87) PCT Pub. No.: WO2015/137100
PCT Pub. Date: Sep. 17, 2015

(65) Prior Publication Data
US 2017/0088095 A1   Mar. 30, 2017

(30) Foreign Application Priority Data
Mar. 12, 2014  (JP) ................................. 2014-049435

(51) Int. Cl.
*B60R 22/34* (2006.01)
*F16D 7/04* (2006.01)
(Continued)

(52) U.S. Cl.
CPC .......... *B60R 22/3413* (2013.01); *B60R 22/24* (2013.01); *B60R 22/28* (2013.01);
(Continued)

(58) Field of Classification Search
CPC . B60R 22/4676; B60R 22/28; B60R 22/3413; B60R 22/341
See application file for complete search history.

(56) References Cited

U.S. PATENT DOCUMENTS 6,497,379 B2 * 12/2002 Yano ................... B60R 22/3413
                                                   242/379.1
8,262,059 B2    9/2012 Dolenti et al.
(Continued)

FOREIGN PATENT DOCUMENTS

DE   10 2009 010 435 A1   9/2010
DE   10 2008 049 931 B4   3/2012
(Continued)

OTHER PUBLICATIONS

International Search Report issued in International Patent Application No. PCT/JP2015/054955 dated May 26, 2015.

*Primary Examiner* — James A English
(74) *Attorney, Agent, or Firm* — Foley & Lardner LLP (57) ABSTRACT

To provide an energy absorbing device, a seat belt retractor, and a seat belt apparatus that can vary an energy absorbing amount depending on increase and decrease of rotation speed between relatively rotating objects and can improve durability. An energy absorbing device includes a casing connected to one object, an annular first clutch disc disposed in the casing, an annular second clutch disc disposed in the casing, and an annular clutch plate connected to the other object and having an engaging surface that faces both the first clutch disc and the second clutch disc, wherein the engaging outer teeth of the first clutch disc and the engaging inner teeth of the second clutch disc alternately engage with the engaging teeth of the clutch plate so as to absorb an energy generated by a relative rotation between one object and the other object.

8 Claims, 10 Drawing Sheets (51) Int. Cl.
*B60R 22/24* (2006.01)
*B60R 22/28* (2006.01)

(52) U.S. Cl.
CPC ........ *F16D 7/044* (2013.01); *B60R 2022/285* (2013.01); *B60R 2022/289* (2013.01)

(56) References Cited

U.S. PATENT DOCUMENTS

| | | |
|---|---|---|
| 8,473,162 B2 | 6/2013 | Jabusch |
| 8,523,140 B2 | 9/2013 | Dolenti et al. |
| 8,529,398 B2 | 9/2013 | Jabusch |
| 9,242,617 B2 | 1/2016 | Singer et al. |
| 2002/0096591 A1* | 7/2002 | Tanji ............... B60R 22/343 242/390.8 |
| 2004/0124625 A1* | 7/2004 | Bae ................ B60R 22/3413 280/807 |
| 2005/0133330 A1 | 6/2005 | Stiefvater |
| 2006/0071111 A1* | 4/2006 | Tanaka ............... B60R 22/46 242/374 |
| 2013/0140391 A1 | 6/2013 | Jabusch |
| 2015/0083841 A1 | 3/2015 | Singer et al. |
| 2015/0203070 A1 | 7/2015 | Singer et al. |
| 2017/0088095 A1* | 3/2017 | Uchibori ............ B60R 22/3413 |
| 2017/0240135 A1* | 8/2017 | Uchibori ................ B60R 22/28 |
| 2017/0291571 A1* | 10/2017 | Takamatsu ............ B60R 22/44 |
| 2017/0341623 A1* | 11/2017 | Huh .................... B60R 22/405 |

FOREIGN PATENT DOCUMENTS

| | | |
|---|---|---|
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2013 203 286 B4 | 8/2014 |
| DE | 10 2014 202 498 B3 | 3/2015 |
| DE | 10 2013 220 949 A1 | 4/2015 |
| EP | 1 874 593 B1 | 12/2010 |
| JP | 2013-184538 A | 9/2013 |
| JP | 2015-128925 A | 7/2015 |
| WO | WO-2004/096611 A1 | 11/2004 |
| WO | WO-2007/130041 A1 | 11/2007 |
| WO | WO-2010/139433 A1 | 12/2010 |
| WO | WO-2012/059166 A1 | 5/2012 |
| WO | WO-2012/156019 A1 | 11/2012 |
| WO | WO-2012/156020 A1 | 11/2012 |
| WO | WO-2013/079150 A1 | 6/2013 |
| WO | WO-2014/131824 A1 | 9/2014 |
| WO | WO-2015/055570 A1 | 4/2015 |
| WO | WO-2015/121159 A1 | 8/2015 |

* cited by examiner

FIG.9

ENERGY ABSORBING DEVICE, SEAT BELT RETRACTOR AND SEAT BELT APPARATUS

CROSS-REFERENCE TO RELATED APPLICATIONS

The present application is a U.S. national stage application of International Patent Application No. PCT/JP2015/054955, filed Feb. 23, 2015, which claims the benefit of priority to Japanese Patent Application No. 2014-049435, filed Mar. 12, 2014, the entireties of which are hereby incorporated by reference.

TECHNICAL FIELD

The present invention relates to an energy absorbing device, a seat belt retractor and a seat belt apparatus, and specifically, an energy absorbing device disposed between relatively rotating objects, a seat belt retractor having the energy absorbing device, and a seat belt apparatus having the seat belt retractor.

BACKGROUND ART

For example, in a retractor (including a rewinding function) for a long object such as a strip or a string, a winding drum (also called a drum or a spool) that retracts a long object rotates relative to a support unit that rotatably supports the winding drum. It is preferable to dispose an energy absorbing device between relatively moving objects since a large load is applied to the apparatus and the long object when the long object is fully extended or when the winding drum stops during retracting or rewinding of the long object in the apparatus which performs a relative movement. Typically, an example of such a retractor is a seat belt retractor used in a seat belt apparatus (for example, see Patent Literature 1 or 2).

Patent Literature 1 discloses a seat belt retractor in which a torsion bar and a wire are disposed between a winding drum and a ratchet gear which relatively rotate. This seat belt retractor can absorb an energy generated between the winding drum and the ratchet gear due to twisting deformation of the torsion bar and sliding deformation of the wire, and can change the energy absorbing properties by varying a withdrawing load necessary for sliding deformation of the wire.

Patent Literature 2 discloses a vehicular force limiter in which ring discs (1, 3) and an oscillation member (2) are disposed between relatively rotating objects. In the above limiter, when the oscillation member (2) rotates relative to the ring discs (1, 3), projections (5) formed on the oscillation member (2) come into contact with projections (7, 8) formed on the ring discs (1, 3) while oscillating alternately, thereby absorbing an energy generated between the relatively rotating objects. In particular, in the above limiter, a kinetic energy varies depending on a rotation speed of the oscillation member (2), and an energy absorbing amount can be increased with increase of the rotation speed of the oscillation member (2).

CITATION LIST

Patent Literature

PTL 1: Japanese Unexamined Patent Application Publication No. 2013-184538
PTL 2: International Publication No. 2012/059166

SUMMARY OF INVENTION

Technical Problem

In the seat belt apparatus having the seat belt retractor provided with the energy absorbing device described in Patent Literature 1 or 2, an occupant sitting in the vehicle may be a person with various builds such as a man or a woman, a person having a large build or a small build. Accordingly, even in the same seat belt apparatus, a load applied to the webbing or the retractor during a vehicle collision may vary.

In order to address the variation of the loads, a sensor that determines the build of an occupant or an energy absorbing device that can accommodate various loads needs to be disposed in the vehicle. Such a problem occurs not only in the seat belt retractor, but also in a retractor, for example, that retracts long objects of different thicknesses or types (such as fabrics and plates).

However, in the energy absorbing device described in Patent Literature 1, although the energy absorbing properties can be changed to two stages of the wire and the torsion bar, the energy absorbing properties cannot be changed steplessly.

Further, in the energy absorbing device described in Patent Literature 2, the energy absorbing amount can be changed depending on the rotation speed of the oscillation member to accommodate occupants of various builds. However, when the load is applied unevenly to the entire periphery of the oscillation member, load concentration occurs since the oscillation member reciprocates between the ring discs, which often causes damage to the oscillation member. Further, since the oscillation member oscillates while rotating, deformation due to counterforce from the ring disc may occur. This causes a problem of accumulation of metal fatigue and reduced durability.

The present invention has been made to overcome the above problems, and has an object to provide an energy absorbing device, a seat belt retractor and a seat belt apparatus that can vary an energy absorbing amount depending on increase and decrease of rotation speed between relatively rotating objects and can improve durability.

Solution to Problem

According to an aspect of the present invention, an energy absorbing device disposed between relatively rotating objects includes: a casing connected to one object; a first clutch disc of an annular shape disposed to be reciprocatable in a rotation axis direction in the casing; a second clutch disc of an annular shape disposed inside the first clutch disc to be reciprocatable in the rotation axis direction in the casing; and a clutch plate of an annular shape connected to the other object and having an engaging surface that faces both the first clutch disc and the second clutch disc, wherein the clutch plate has engaging teeth with ridges and grooves arranged in a circumferential direction of the engaging surface, the first clutch disc has engaging outer teeth on a surface which faces the engaging surface so as to be engageable with the engaging teeth, the second clutch disc has engaging inner teeth on a surface which faces the engaging surface so as to be engageable with the engaging teeth, and the engaging outer teeth and the engaging inner teeth alternately engage with the engaging teeth so as to absorb an energy generated by relative rotation between one object and the other object.

The energy absorbing device may include a plurality of oscillation members arranged in a circumferential direction to be able to oscillate inwardly and outwardly in a radial direction between the first clutch disc, the second clutch disc, and the casing so that the oscillation members oscillate to alternately reciprocate the first clutch disc and the second clutch disc in the rotation axis direction.

The casing may include a plurality of partition members that partition the disposed positions of the oscillation members. Further, the partition member may include a projection that partitions the disposed position of the first clutch disc and the disposed position of the second clutch disc. The first clutch disc may include a locking section that protrudes inward in a radial direction and is disposed between the partition members, and the second clutch disc may include locking sections that protrudes outward in a radial direction and is disposed between the partition members.

The clutch plate may be disposed in the casing to be rotatable relatively to the casing, and the casing may include a cover plate that regulates movement of the clutch plate in the rotation axis direction.

Further, according to another aspect of the present invention, a seat belt retractor includes: a spool that retracts a webbing that restrains an occupant; and a base frame that rotatably holds the spool, wherein an energy absorbing device is disposed between the base frame or a component fixed to the base frame and the spool, and the energy absorbing device is the energy absorbing device according to the above aspect of the present invention.

Further, according to another aspect of the present invention, a seat belt apparatus includes: a webbing that restrains an occupant; a seat belt retractor that retracts the webbing; a belt anchor that fixes the webbing to a vehicle body; a buckle provided on a side face of the seat; and a tongue disposed on the webbing, wherein the seat belt retractor is the seat belt retractor having the energy absorbing device according to the above aspect of the present invention.

Advantageous Effects of Invention

According to the energy absorbing device, the seat belt retractor, and the seat belt apparatus of the present invention, for the relatively rotating clutch plates, the first clutch disc and the second clutch disc are alternately reciprocated in a rotation axis direction so that the engaging outer teeth and the engaging inner teeth alternately engage with the engaging teeth. Accordingly, it is possible to increase and decrease the reciprocation speed of the first clutch disc and the second clutch disc depending on increase and decrease of the relative rotation speed of the clutch plates, and to vary the energy absorbing amount depending on increase and decrease of rotation speed between relatively rotating objects.

Further, according to the present invention, since the rotating component (clutch plate) and the reciprocating component (first clutch disc and second clutch disc) perform the respective functions, a counterforce generated during actuation can be distributed to the respective components, thereby reducing accumulation of metal fatigue and improving durability. Moreover, since only one surface of the first clutch disc and the second clutch disc engages with the clutch plate, the structural strength of the first clutch disc, the second clutch disc, and the clutch plate can be easily improved, thereby improving the durability of the energy absorbing device.

BRIEF DESCRIPTION OF DRAWINGS

FIG. 2 is an assembly view of components of the energy absorbing device shown in FIG. 1, in which

FIG. 3 is a front view of a clutch plate, in which

FIG. 4 is a view of an operation of the energy absorbing device during rotation of the clutch plate, in which

FIG. 5 is a view of an operation of the energy absorbing device during rotation of the casing, in which

DESCRIPTION OF EMBODIMENTS

Figure 1:
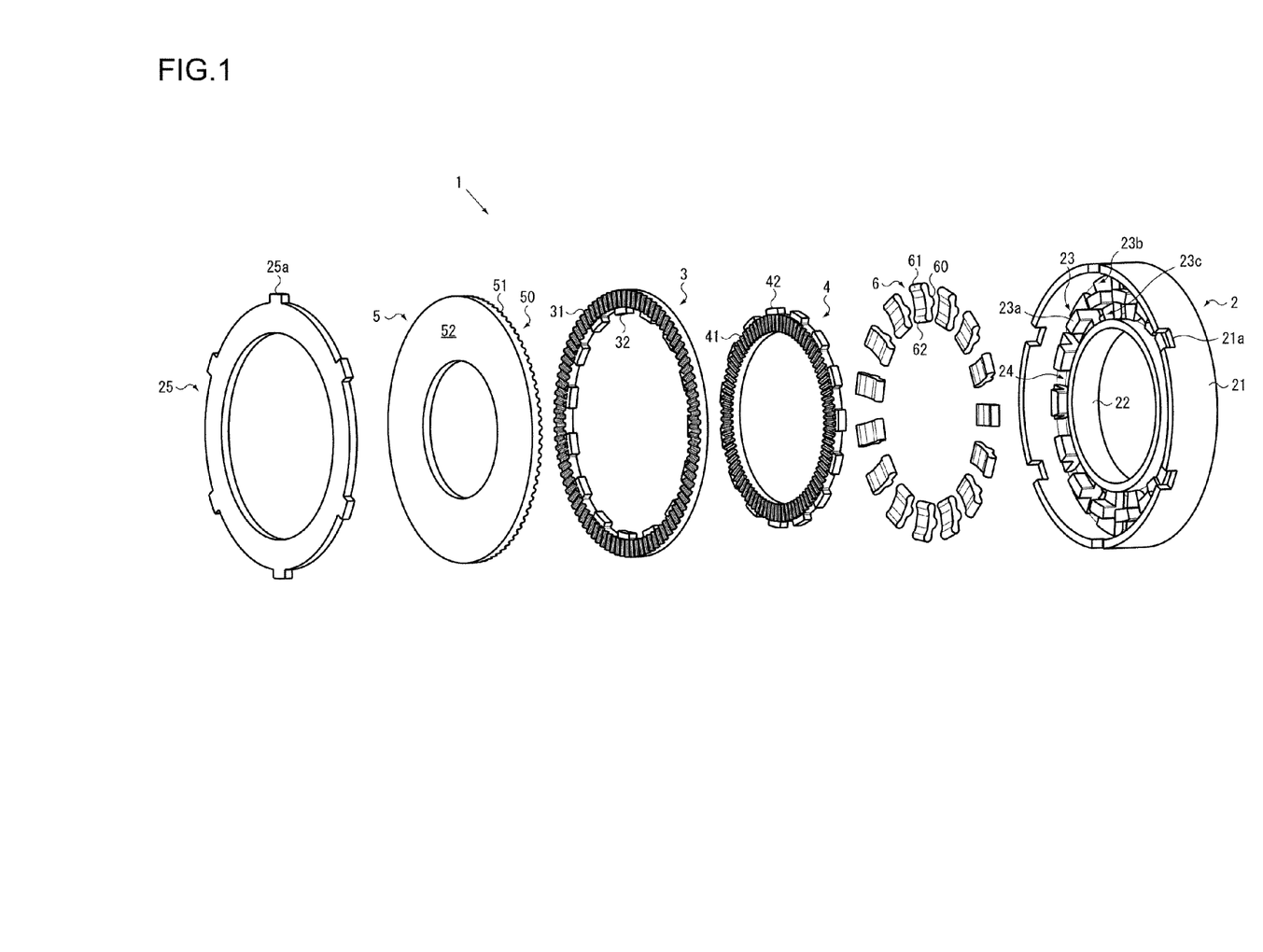
FIG. 1 is a development view of components of an energy absorbing device according to an embodiment of the present invention.
Figure 2A:
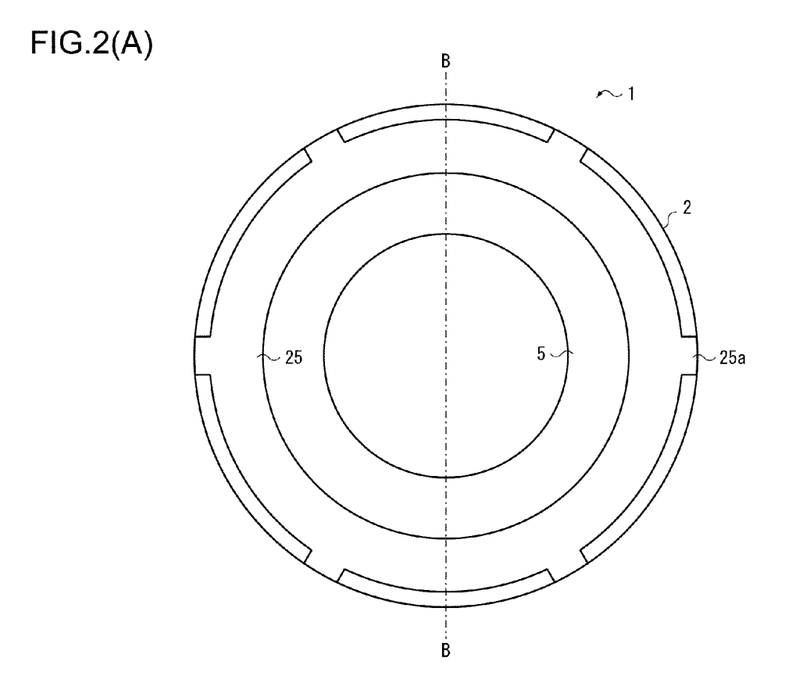
FIG. 2(A) is a plan view and FIG. 2(B) is a sectional view taken along the line B-B of FIG. 2(A).
Figure 2B:
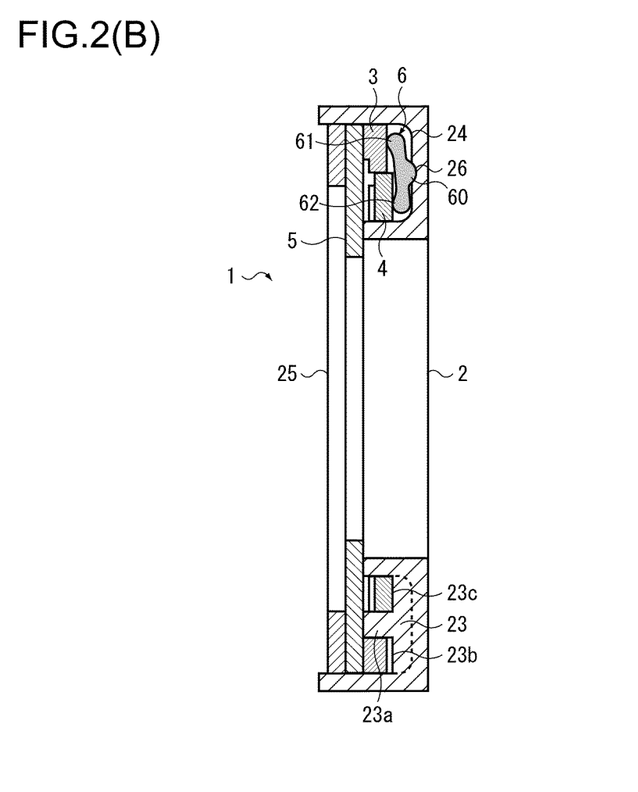
Figure 3A:
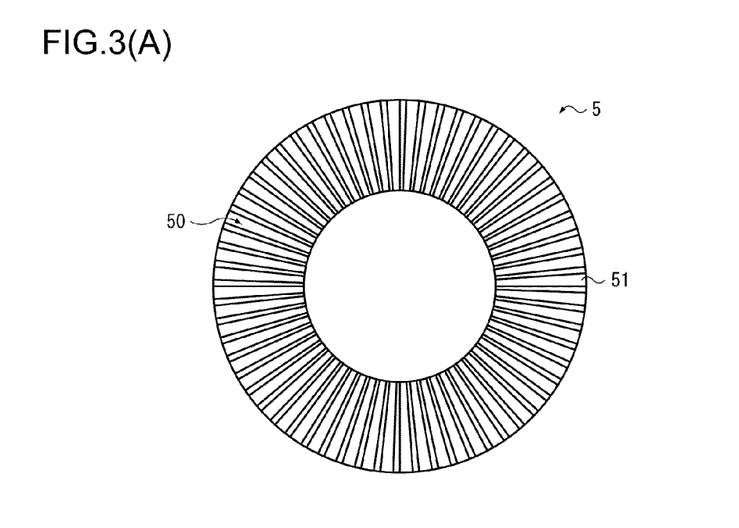
FIG. 3(A) shows a first example.
Figure 3B:
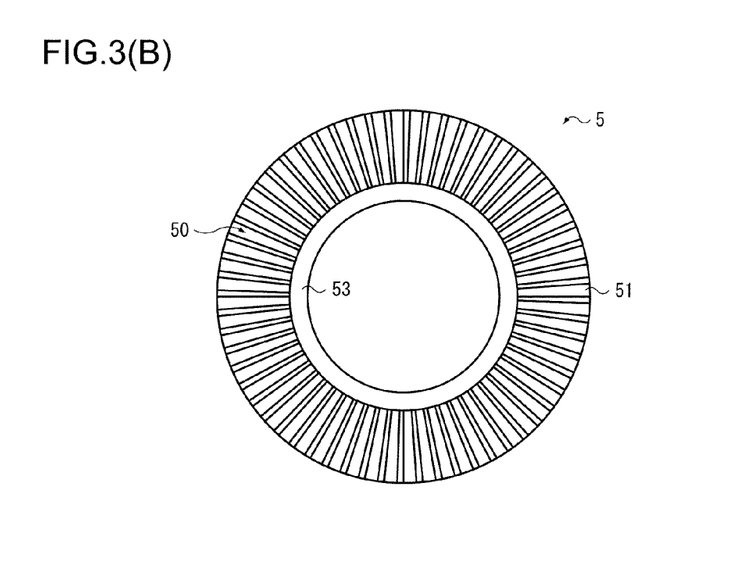
FIG. 3(B) shows a second example.
Figure 3C:
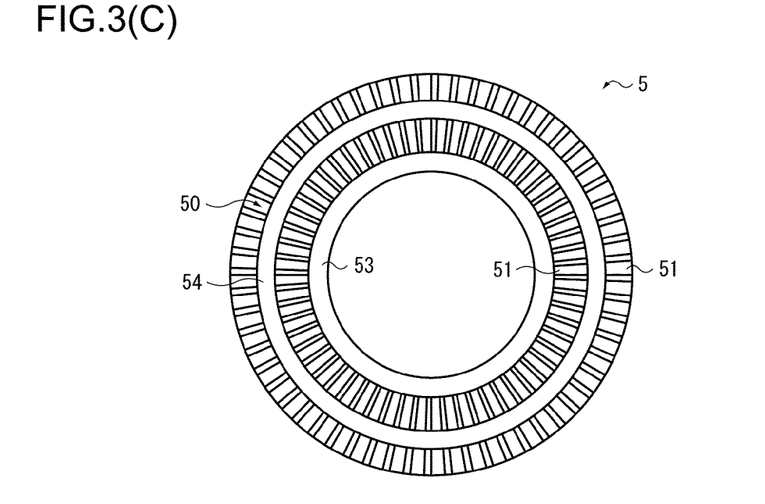
FIG. 3(C) shows a third example.

With reference to FIGS. 1 to 9, an embodiment of the present invention will be described below. FIG. 1 is a development view of components of an energy absorbing device according to an embodiment of the present invention. FIG. 2 is an assembly view of components of the energy absorbing device shown in FIG. 1, in which FIG. 2(A) is a plan view and FIG. 2(B) is a sectional view taken along the line B-B of FIG. 2(A). FIG. 3 is a front view of a clutch plate, in which FIG. 3(A) shows a first example, FIG. 3(B) shows a second example, and FIG. 3(C) shows a third example.

As shown in FIGS. 1, 2(A), and 2(B), an energy absorbing device 1 according to an embodiment of the present invention is an energy absorbing device disposed between relatively rotating objects and includes a casing 2 connected to one object, an annular first clutch disc 3 disposed to be reciprocatable in the rotation axis direction in the casing 2, an annular second clutch disc 4 disposed inside the first clutch disc 3 to be reciprocatable in the rotation axis direction in the casing 2, and an annular clutch plate 5 connected to the other object and having an engaging surface 50 that faces both the first clutch disc 3 and the second clutch disc 4, wherein the clutch plate 5 has engaging teeth 51 with ridges and grooves arranged in a circumferential direction of the engaging surface 50, the first clutch disc 3 has engaging outer teeth 31 on a surface which faces the engaging surface 50 so as to be engageable with the engaging teeth 51, and the second clutch disc 4 has engaging inner teeth 41 on a surface which faces the engaging surface 50 so as to be engageable with the engaging teeth 51, and the engaging outer teeth 31 and the engaging inner teeth 41 alternately engage with the engaging teeth 51 so as to absorb an energy generated by a relative rotation between one object and the other object.

Further, a plurality of oscillation members 6 are arranged in a circumferential direction to be able to oscillate inwardly and outwardly in a radial direction between the first clutch disc 3, the second clutch disc 4 and the casing 2 so that the oscillation members 6 oscillate to alternately reciprocate the first clutch disc 3 and the second clutch disc 4 in the rotation axis direction. Further, a component that alternately reciprocates the first clutch disc 3 and the second clutch disc 4 in the rotation axis direction is not limited to the oscillation members 6 shown in the figure, but may be spring members disposed between the first clutch disc 3 and the casing 2 and between the second clutch disc 4 and the casing 2.

The casing 2 has a bottomed cylindrical shape that can house the first clutch disc 3 and the second clutch disc 4 having a circular outer shapes. Further, the casing 2 has a double cylindrical shape having a cylindrical outer wall 21 and a cylindrical inner wall 22. It should be noted that the shape of the casing 2 shown in the figure is a mere example, and is not limited to a cylindrical shape as far as the casing 2 can house the first clutch disc 3 and the second clutch disc 4. The center portion of the casing 2 (an inner diameter part of the inner wall 22) may be hollow or solid.

The casing 2 includes a plurality of partition members 23 that partition the disposed positions of the respective oscillation members 6. The partition members 23 are the wall members connected to the outer wall 21 and the inner wall 22 and are formed radially. Accordingly, a plurality of projections and recesses can be formed alternately in the circumferential direction of the casing 2 such that oscillation members 6 are housed in the recesses 24 formed in gaps between the respective partition members 23.

Further, the partition member 23 includes a projection 23a that partitions the disposed position of the first clutch disc 3 and the disposed position of the second clutch disc 4. The projection 23a is formed at a substantially center of the partition member 23 that connects the outer wall 21 and the inner wall 22, and the partition member 23 has a substantially T-shaped cross section. A housing space 23b for the first clutch disc 3 is formed outside the projections 23a between the partition members 23 and the outer wall 21, and a housing space 23c for the second clutch disc 4 is formed inside the projections 23a between the partition members 23 and the inner wall 22.

The first clutch disc 3 is an annular plate member housed in the housing space 23b formed by a plurality of partition members 23 and is provided with the engaging outer teeth 31 on a surface opposite to a contact surface with the partition member 23. A surface of the partition member 23 has a plurality of radially formed grooves which provide ridges and grooves arranged in the circumferential direction, thereby forming the engaging outer teeth 31. The first clutch disc 3 may have locking sections 32 that protrude inward in the radial direction and are disposed between the respective partition members 23.

Accordingly, when the first clutch disc 3 is housed in the housing space 23b, the locking sections 32 are disposed adjacent to the projections 23a of the partition members 23. The locking sections 32 lock the projections 23a, therefore suppress rotation of the first clutch disc 3 in the circumferential direction.

The second clutch disc 4 is an annular plate member housed in the housing space 23c formed by a plurality of partition members 23 and is provided with the engaging inner teeth 41 on a surface opposite to a contact surface with the partition member 23. A surface of the partition member 23 has a plurality of radially formed grooves which provide ridges and grooves arranged in the circumferential direction, thereby forming the engaging inner teeth 41. The second clutch disc 4 may have locking sections 42 that protrude outward in the radial direction and are disposed between the respective partition members 23.

Accordingly, when the second clutch disc 4 is housed in the housing space 23c, the locking sections 42 are disposed adjacent to the projections 23a of the partition members 23. The locking sections 42 lock the projections 23a, therefore suppress rotation of the second clutch disc 4 in the circumferential direction. With this configuration, the first clutch disc 3 and the second clutch disc 4 are prevented from rotating relatively to the casing 2.

The clutch plate 5 is an annular plate member having the engaging surface 50 that faces the engaging outer teeth 31 of the first clutch disc 3 and the engaging inner teeth 41 of the second clutch disc 4. As shown in FIGS. 3(A) to 3(C), a surface of the engaging surface 50 has a plurality of radially formed grooves which provide ridges and grooves arranged in the circumferential direction, thereby forming the engaging teeth 51. The clutch plate 5 is not limited to an annular shape and may be a disc shape.

In the engaging outer teeth 31, the engaging inner teeth 41, and the engaging teeth 51, the teeth (or grooves) are formed in the same phase so that the engaging outer teeth 31 of the first clutch disc 3 and the engaging inner teeth 41 of the second clutch disc 4 mesh with the engaging teeth 51 of the clutch plate 5.

As shown in the first example in FIG. 3(A), the engaging teeth 51 of the clutch plate 5 may be formed on the entire surface of the engaging surface 50. Further, as shown in the second example in FIG. 3(B), the engaging surface 50 may have a flat section 53 on which the engaging teeth 51 are not formed on a portion that faces the inner wall 22 of the clutch plate 5. Further, as shown in the third example in FIG. 3(C), the engaging surface 50 may have a flat section 54 on which the engaging teeth 51 are not formed on a portion that faces the projection 23a of the partition member 23.

Further, the clutch plate 5 is disposed in the casing 2 to be rotatable relatively to the casing 2, and the casing 2 includes a cover plate 25 that regulates movement of the clutch plate 5 in the rotation axis direction. The cover plate 25 is, for example, an annular member that can be housed in the casing 2, and includes a plurality of projections 25a on the outer periphery. Further, notches 21a in which the projections 25a of the cover plate 25 can be inserted are formed on the edge of the outer wall 21 of the casing 2.

Further, it is preferable that a surface of the clutch plate 5 (back surface 52) opposite to the engaging surface 50 is provided so as to decrease friction resistance to the inner surface of the cover plate 25 fixed to the casing 2.

Further, the shape or fixing method of the cover plate 25 is not limited to the configuration shown in the figure and, for example, the cover plate 25 may be in a disc shape, a lid member that can be threaded in the casing 2, or a configuration that can be fixed to the inner wall 22.

The oscillation member 6 has a substantially plate shape that can be housed in the recess 24 of the casing 2, and has a support point 60 which is slidable while being in contact with the bottom of the casing 2, a first force point 61 that transmits a drive force while being in contact with the first clutch disc 3, and a second force point 62 that transmits a drive force while being in contact with the second clutch disc 4. The support point 60 may be a shape that protrudes in a shaft shape or in a spherical shape. Further, a recess 26 that supports the support point 60 may be formed on the bottom of the casing 2 that faces the support point 60.

Portions of the first force point 61 and the second force point 62 which is in contact with the first clutch disc 3 and the second clutch disc 4 may have a protruding curved section. With this configuration, a stress generated by contact between the oscillation member 6 and the first clutch disc 3, the second clutch disc 4 can be decreased. Further, since the support point 60, the first force point 61, and the second force point 62 are in contact with the casing 2, the first clutch disc 3, and the second clutch disc 4, respectively, a substantially uniform load can be distributed to the entire circumference during reciprocation of the first clutch disc 3 and the second clutch disc 4 so as to prevent the concentration of stress and damage to the engaging teeth 50, the engaging outer teeth 31, and the engaging inner teeth 41.

In the assembled state of the above components as shown in FIG. 2(B), when the second force point 62 of the oscillation member 6 is inclined to be in contact with the bottom of the casing 2, the first force point 61 is inclined in the direction toward the clutch plate 5. In this state, the engaging outer teeth 31 of the first clutch disc 3 mesh with the engaging teeth 51 of the clutch plate 5. Similarly, although not shown in the figure, when the first force point 61 of the oscillation member 6 is inclined to be in contact with the bottom of the casing 2, the second force point 62 is inclined in the direction toward the clutch plate 5. In this state, the engaging inner teeth 41 of the second clutch disc 4 mesh with the engaging teeth 51 of the clutch plate 5.

Figure 4A:
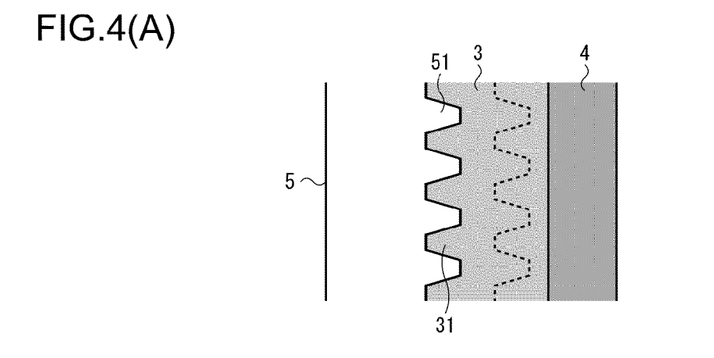
FIG. 4(A) shows a first clutch disc engagement state.
Figure 4B:
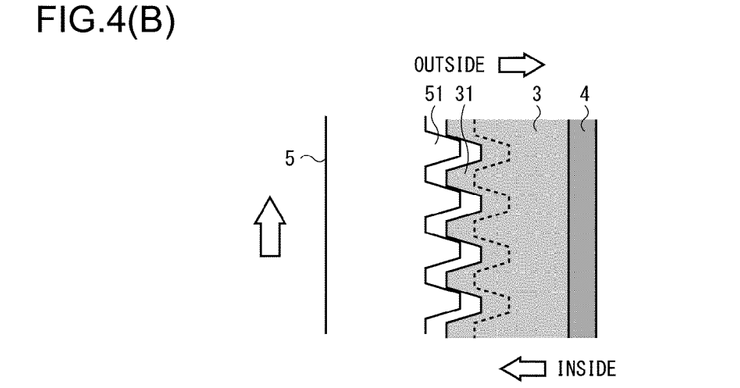
FIG. 4(B) shows a relative rotation start state.
Figure 4C:
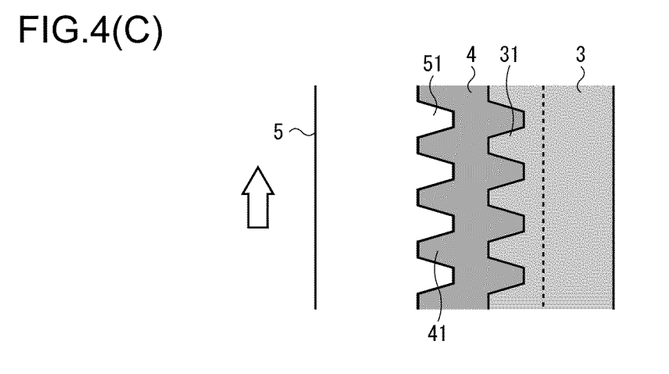
FIG. 4(C) shows a second clutch disc engagement state.
Figure 5A:
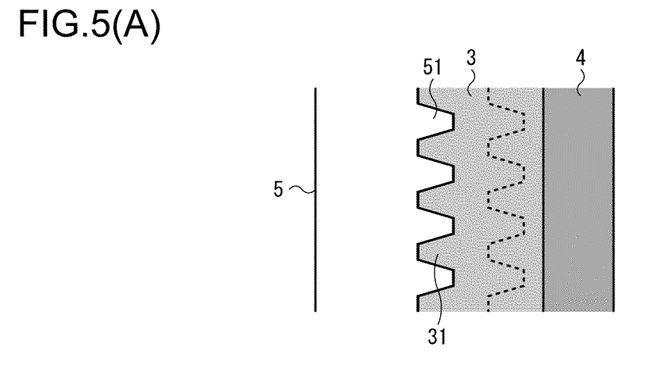
FIG. 5(A) shows a first clutch disc engagement state.
Figure 5B:
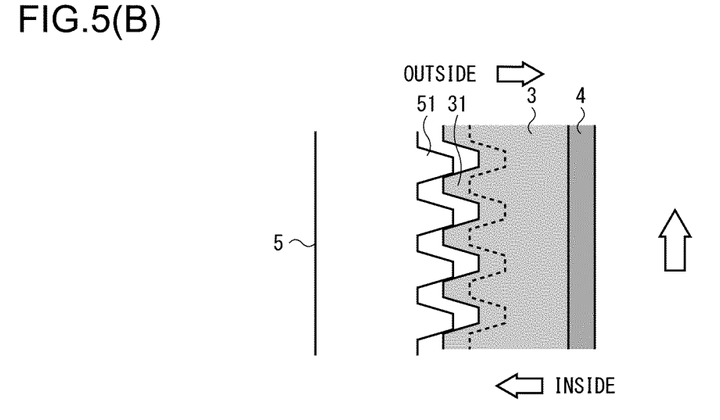
FIG. 5(B) shows a relative rotation start state.
Figure 5C:
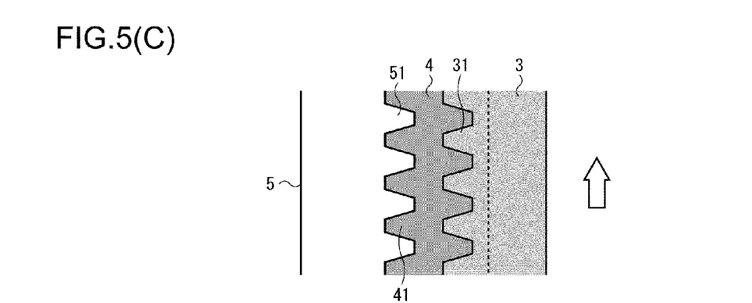
FIG. 5(C) shows a second clutch disc engagement state.
Figure 6:
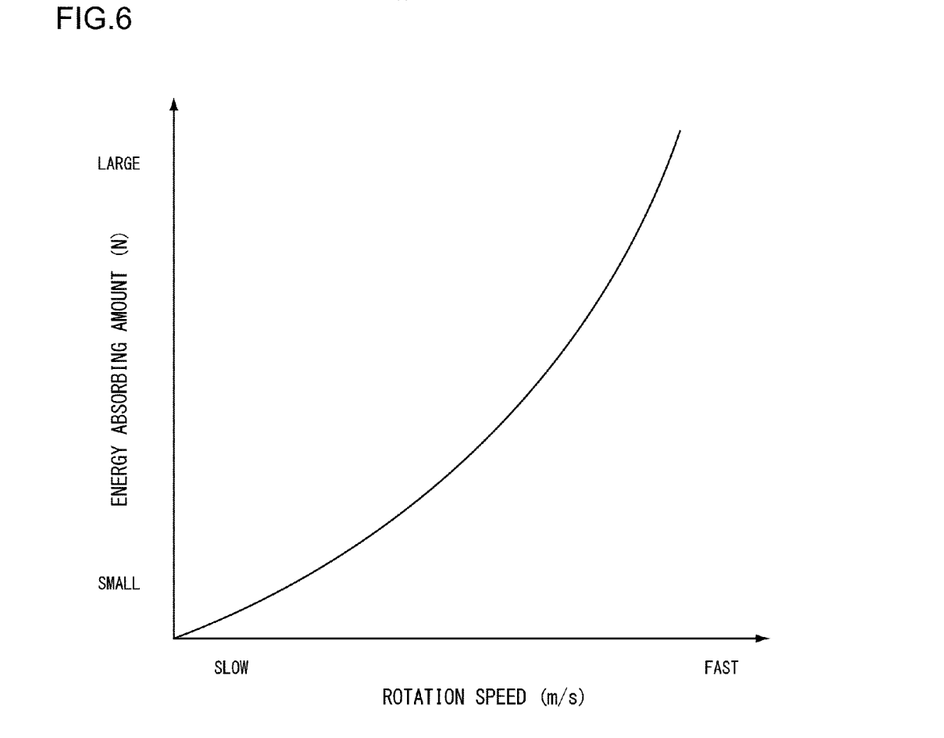
FIG. 6 is a diagram which shows a relationship between a rotation rate of the relative rotation and a load generated by the energy absorbing device.

Next, with reference to FIGS. 4 to 6, an operation of the above energy absorbing device 1 will be described. FIG. 4 is a view of an operation of the energy absorbing device during rotation of the clutch plate, in which FIG. 4(A) shows a first clutch disc engagement state, FIG. 4(B) shows a relative rotation start state, and FIG. 4(C) shows a second clutch disc engagement state. FIG. 5 is a view of an operation of the energy absorbing device during rotation of the casing, in which FIG. 5(A) shows a first clutch disc engagement state, FIG. 5(B) shows a relative rotation start state, and FIG. 5(C) shows a second clutch disc engagement state. FIG. 6 is a diagram which shows a relationship between a rotation rate of the relative rotation and a load generated by the energy absorbing device.

The explanatory views shown in FIGS. 4(A) to 4(C) show an operation when the casing 2 is fixed and the clutch plate 5 rotates, while the explanatory views shown in FIGS. 5(A) to 5(C) show an operation when the clutch plate 5 is fixed and the casing 2 rotates. Further, the oscillation member 6 is not shown in FIG. 4 and FIG. 5.

As shown in FIG. 4(A), it is assumed that the engaging teeth 51 of the clutch plate 5 engage with the engaging outer teeth 31 of the first clutch disc 3. In this state, when the clutch plate 5 rotates in the up direction in the figure, a relative rotation is generated among the first clutch disc 3, the second clutch disc 4, and the clutch plate 5 since the first clutch disc 3 and the second clutch disc 4 are housed in the casing 2 so as not to rotate.

As shown in FIG. 4B, as the engaging teeth 51 of the clutch plate 5 moves, the engaging outer teeth 31 of the first clutch disc 3 are pushed in the direction away from the clutch plate 5. Further, at the same time, as the first clutch disc 3 is pushed in the direction away from the clutch plate 5 due to the operation of the oscillation member 6, the second clutch disc 4 moves in the direction toward the clutch plate 5.

Finally, in the state in which the engaging outer teeth 31 of the first clutch disc 3 and the engaging teeth 51 of the clutch plate 5 are disengaged, the engaging inner teeth 41 of the second clutch disc 4 engage with the engaging teeth 51 of the clutch plate 5 as shown in FIG. 4(C). As the clutch plate 5 rotates, the first clutch disc 3 and the second clutch disc 4 alternately reciprocate in the rotation axis direction so that the engaging outer teeth 31 and the engaging inner teeth 41 alternately engage with the engaging teeth 51.

Then, as shown in FIG. 5(A), it is assumed that the engaging teeth 51 of the clutch plate 5 engage with the engaging outer teeth 31 of the first clutch disc 3. In this state, when the casing 2 rotates in the up direction in the figure, a relative rotation is generated among the first clutch disc 3, the second clutch disc 4, and the clutch plate 5 since the first clutch disc 3 and the second clutch disc 4 are housed in the casing 2 so as not to rotate.

Since the movement of the clutch plate 5 in the axis direction is regulated, as the engaging outer teeth 31 of the first clutch disc 3 moves, the engaging outer teeth 31 of the first clutch disc 3 are pushed in the direction away from the clutch plate 5 as shown in FIG. 5(B). Further, as the first clutch disc 3 is pushed in the direction away from the clutch plate 5 due to the operation of the oscillation member 6, the second clutch disc 4 moves in the direction toward the clutch plate 5.

Finally, in the state in which the engaging outer teeth 31 of the first clutch disc 3 and the engaging teeth 51 of the clutch plate 5 are disengaged, the engaging inner teeth 41 of the second clutch disc 4 engage with the engaging teeth 51 of the clutch plate 5 as shown in FIG. 5(C). As the casing 2 rotates, the first clutch disc 3 and the second clutch disc 4 alternately reciprocate in the rotation axis direction so that the engaging outer teeth 31 and the engaging inner teeth 41 alternately engage with the engaging teeth 51.

According to the above configuration of the energy absorbing device 1 of the present embodiment, when a relative rotation rate of the clutch plate 5 to the casing 2 increases, a reciprocation rate (oscillating rate) of the first clutch disc 3 and the second clutch disc 4 increases accordingly, thereby a kinetic energy ($E=\frac{1}{2} \cdot mV^2$) of the first clutch disc 3 and the second clutch disc 4 increases.

Accordingly, a vertical resistance N when the first clutch disc 3 and the second clutch disc 4 come into contact with the clutch plate 5 increases, and a friction force ($F=\mu N$) generated among the engaging outer teeth 31, the engaging inner teeth 41, and the engaging teeth 51 increases. In addition, a friction force generated to the wall surface of the casing 2 due to reciprocation of the first clutch disc 3 and the second clutch disc 4 also increases. As a result, the kinetic energy generated by a relative rotation of the clutch plate 5 can be converted into a friction force by reciprocation of the first clutch disc 3 and the second clutch disc 4, thereby absorbing the kinetic energy of the clutch plate 5.

Particularly, in the energy absorbing device 1 according to the present embodiment, an energy absorbing amount (N) varies to the relative rotation rate (m/s) as shown in FIG. 6 so that the energy absorbing amount can be decreased when the rotation rate is small, and the energy absorbing amount can be increased when the rotation rate is large. Further, in FIG. 6, although the energy absorbing amount to the rotation rate is indicated by the quadratic curve in which the energy absorbing amount increases with increase of acceleration of the rotation rate, it may have a proportional relation in which the energy absorbing amount increases with increase of the rotation rate.

Further, in the energy absorbing device 1 according to the present embodiment, since only one surface of the first clutch disc 3 and the second clutch disc 4 engages with the clutch plate 5, the structural strength of the first clutch disc 3, the second clutch disc 4, and the clutch plate 5 can be easily improved, thereby improving the durability of the energy absorbing device 1. For example, the thickness of the first clutch disc 3, the second clutch disc 4 and the clutch plate 5 can be easily changed, and the back surface of the first clutch disc 3, the second clutch disc 4 and the clutch plate 5 can be easily reinforced.

Figure 7:
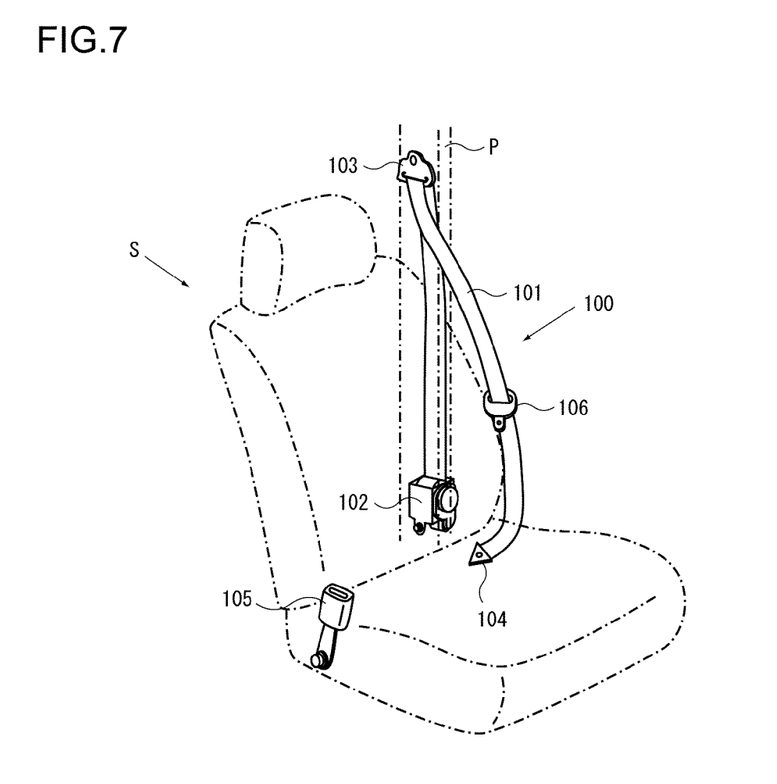
FIG. 7 is an overall configuration view of a seat belt apparatus according to the present embodiment.
Figure 8:
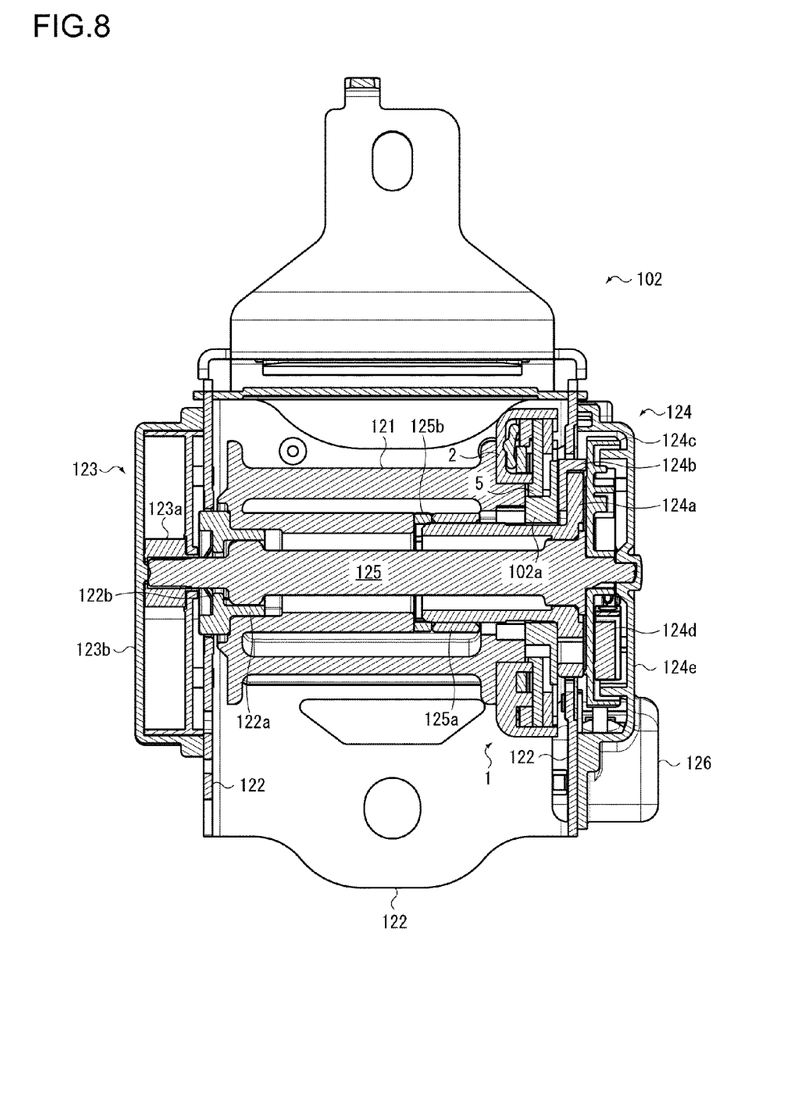
FIG. 8 is a cross sectional view of a seat belt retractor according to the present embodiment.
Figure 9:
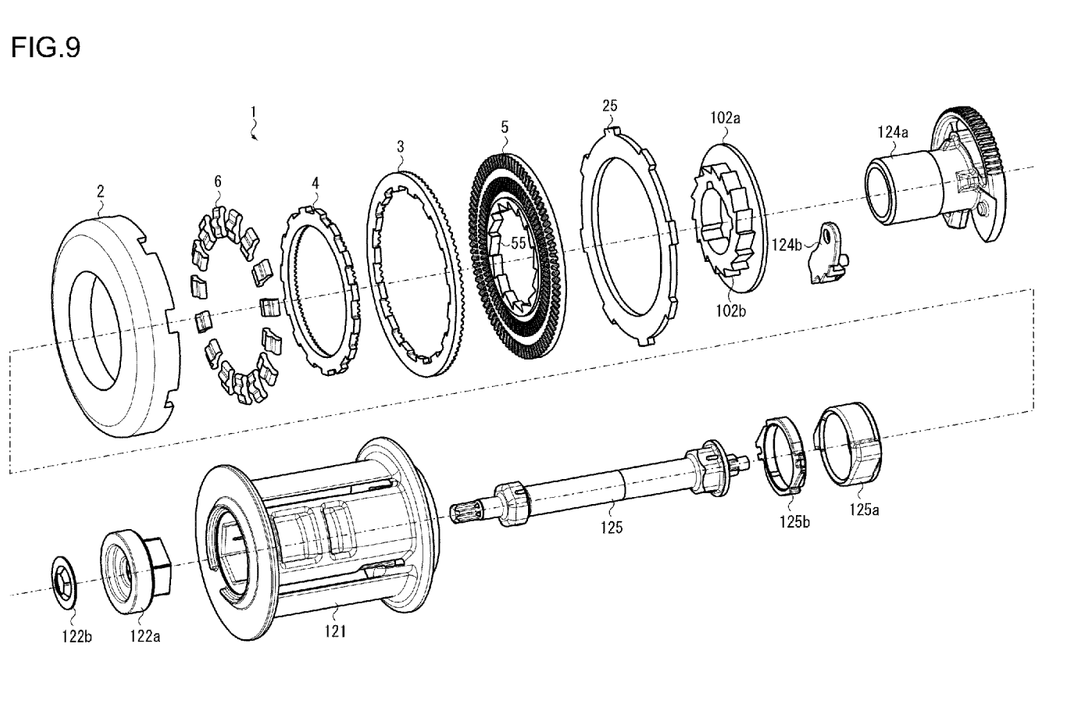
FIG. 9 is a development view of components of a shaft unit of the seat belt retractor shown in FIG. 8.

Next, with reference to FIGS. 7 to 9, a seat belt retractor and a seat belt apparatus having the above energy absorbing device 1 will be described. FIG. 7 is an overall configuration view of a seat belt apparatus according to the present embodiment. FIG. 8 is a cross sectional view of a seat belt retractor according to the present embodiment. FIG. 9 is a development view of components of a shaft unit of the seat belt retractor shown in FIG. 8.

A seat belt apparatus 100 shown in FIG. 7 includes a webbing 101 that restrains an occupant (not shown in the figure) to a seat S, a seat belt retractor 102 that retracts the webbing 101, a guide anchor 103 that is provided on a vehicle body and guides the webbing 101, a belt anchor 104 that fixes the webbing 101 to the vehicle body, and a buckle 105 provided on the side face of the seat S, and a tongue 106 disposed on the webbing 101.

The seat belt apparatus 100 shown in the figure is a so-called passenger seat belt apparatus, and in many cases, a pillar P is disposed adjacent to the seat S. The seat belt retractor 102 is disposed, for example, in the pillar P, and the guide anchor 103 is disposed on a surface of the pillar P. In such a seat belt apparatus 100, the webbing 101 is withdrawn and the tongue 106 is fitted in the buckle 105 to restrain an occupant to the seat S by using the webbing 101.

Other configuration of the seat belt apparatus 100 than the seat belt retractor 102 is the same as that of the conventional seat belt apparatus, and the detailed description thereof is omitted. Further, the seat belt apparatus 100 is not limited to a passenger seat, and may be a seat belt apparatus for a driver's seat or a seat belt apparatus for a rear seat. The guide anchor 103 may be omitted in a seat belt apparatus for a rear seat.

The seat belt retractor 102 shown in FIG. 8 includes a spool 121 that retracts a webbing (not shown in the figure) that restrains an occupant, a base frame 122 that rotatably holds the spool 121, and an energy absorbing device 1 disposed between the base frame 122 or a component fixed to the base frame 122 and the spool 121. Further, the shaft unit shown in FIG. 9 is the seat belt retractor 102 of FIG. 8 while the base frame 122, a spring unit 123 described below, part of a lock mechanism 124 and an acceleration sensor 126 described below are omitted.

The seat belt retractor 102 includes the base frame 122 that is substantially U-shaped and rotatably supports the spool 121, the spring unit 123 disposed at one end of the spool 121, the lock mechanism 124 disposed on the other end of the spool 121, a torsion bar 125 inserted through the center of the spool 121, and the acceleration sensor 126 that detects an acceleration of the vehicle. Further, although the figure does not show a pre-tensioner that instantly retracts the webbing at the time of a vehicle collision to eliminate a gap between the occupant and the webbing, the seat belt retractor 102 according to the present embodiment may or may not include a pre-tensioner.

The spring unit 123 includes a spring core 123a that forms a shaft of a spiral spring (not shown in the figure), and a spring cover 123b that houses the spiral spring. The spring core 123a is connected to one end of the torsion bar 125. The torsion bar 125 is rotatably supported by a bearing 122a disposed on the base frame 122. Further, a push nut 122b may be disposed on the outside of the bearing 122a for prevention of falling off.

The lock mechanism 124 includes a locking base 124a disposed on an end of the torsion bar 125, a pawl 124b disposed on the locking base 124a in a swingable manner, a lock gear 124c disposed on an end of the torsion bar 125 so as to be adjacent to the outside of the locking base 124a, a flywheel 124d disposed on the lock gear 124c in a swingable manner, and a retainer 124e that houses the above components and rotatably supports the torsion bar 125.

The acceleration sensor 126 is disposed adjacent to the lock mechanism 124 and includes projections that are engageable with teeth formed on the outer periphery of the lock gear 124c when detecting an acceleration generated in the vehicle due to a vehicle collision or the like.

When the acceleration sensor 126 detects an acceleration generated in the vehicle due to a vehicle collision or the like, rotation of the lock gear 124c is suppressed, and accordingly, the flywheel 124d swings. The flywheel 124d is configured to swing the pawl 124b with swing of the flywheel 124d. When swings, the pawl 124b protrudes in an outer diameter direction of the locking base 124a and engages with the teeth formed on the opening of the base frame 122. This engagement of the pawl 124b allows the locking base 124a to be fixed to the base frame 122.

When the webbing is further withdrawn and a predetermined load is generated in the operated state of the lock mechanism 124, the spool 121 connected to the webbing rotates relative to the locking base 124a. Here, the torsion bar 125 twists to absorb an energy generated in the webbing. Further, a maximum torsion rotation speed of the torsion bar 125 is regulated by a stopper 125a fitted on the outer periphery of the shaft of the locking base 124a, thereby preventing the torsion bar 125 from tearing. Alternatively, a collar 125b for backlash prevention may be disposed between the stopper 125a and the spool 121.

The above described seat belt retractor 102 has the same configuration as that of the conventional seat belt retractor, for example, as described in Japanese Unexamined Patent Application Publication No. 2012-30636, and detailed description thereof is omitted.

In addition to the above configuration, the seat belt retractor 102 according to the present embodiment includes a fixation ring 102a fixed to the locking base 124a and an energy absorbing device 1 disposed between the spool 121 and the fixation ring 102a. As shown in FIG. 8, the casing 2 of the energy absorbing device 1 is fixed to the spool 121, and the clutch plate 5 is fixed to the fixation ring 102a. Further, as shown in FIG. 9, the clutch plate 5 has inner teeth on the inner periphery thereof, and the fixation ring 102a has outer teeth which engage with the inner teeth of the clutch plate 5.

Accordingly, when the lock mechanism 124 operates to generate relative rotation between the locking base 124a and the spool 121, the clutch plate 5 and the casing 2 generate relative rotation. As a result, the energy absorbing device 1 operates to absorb an energy generated in the webbing.

Moreover, since the seat belt retractor 102 shown in the figure includes the torsion bar 125 fixed to the bearing 122a, the energy absorbing device 1 operates simultaneously with actuation of the torsion bar 125. Thus, using the energy absorbing device 1 and the torsion bar 125 together reduces a burden to the energy absorbing device 1, thereby reducing the size and weight of the energy absorbing device 1.

In general, an occupant sitting in a vehicle may be a person with a large build (such as a man) or a small build (such as a woman and a child). When a predetermined load is applied, the seat belt retractor 102 having only the conventional torsion bar uniformly operates regardless of whether the occupant is a person with a large build or a small build. For example, when the occupant is a person with a large build, speed reduction is less likely to occur when the upper body of the occupant moves forward due to a vehicle collision or the like. On the other hand, when the occupant is a person with a small build, speed reduction is more likely to occur when the upper body of the occupant moves forward due to a vehicle collision or the like.

Accordingly, if the operation condition of the torsion bar is set depending on whether the occupant has a large build or a small build, a sensor or the like that determines the build of the occupant is separately needed. To the contrary, the seat belt retractor 102 having the energy absorbing device 1 according to the present embodiment can increase or decrease the energy absorbing amount in accordance with the withdrawing speed of the webbing depending on a build of the occupant without using a sensor or the like that determines a build of the occupant, since the energy absorbing amount can be increased or decreased depending on the relative rotation speed.

Although the torsion bar 125 is provided in the above described embodiment, the torsion bar 125 may not be provided. For example, by providing a shaft (not shown in the figure) made of metal or resin having the substantially same shape as that of the torsion bar 125 so that the shaft is freely rotatable to the bearing 122*a*, the spool 121 can rotate relative to the shaft even if the lock mechanism 124 operates. In such a configuration, it is possible to actuate the energy absorbing device 1 by relative rotation of the locking base 124*a* and the spool 121.

The present invention is not limited to the above described embodiment. As a matter of course, various modifications can be made without departing from the spirit of the present invention, and for example, the casing 2 can be fixed to the locking base 124*a* and the clutch plate 5 can be fixed to the spool 121.

The invention claimed is:

1. An energy absorbing device disposed between two relatively rotating objects, the rotating objects being referred to as one object and the other object, comprising:
    a casing connected to one object;
    a first clutch disc of an annular shape disposed to be reciprocatable in a rotation axis direction in the casing;
    a second clutch disc of an annular shape disposed inside the first clutch disc to be reciprocatable in the rotation axis direction in the casing; and
    a clutch plate of an annular shape connected to the other object and having an engaging surface that faces both the first clutch disc and the second clutch disc, wherein
    the clutch plate has engaging teeth with ridges and grooves arranged in a circumferential direction of the engaging surface,
    the first clutch disc has engaging outer teeth on a surface which faces the engaging surface so as to be engageable with the engaging teeth,
    the second clutch disc has engaging inner teeth on a surface which faces the engaging surface so as to be engageable with the engaging teeth, and
    the engaging outer teeth and the engaging inner teeth alternately engage with the engaging teeth so as to absorb an energy generated by relative rotation between one object and the other object.

2. The energy absorbing device according to claim 1, further comprising a plurality of oscillation members arranged in a circumferential direction to be able to oscillate inwardly and outwardly in a radial direction between the first clutch disc, the second clutch disc, and the casing so that the oscillation members swing to alternately reciprocate the first clutch disc and the second clutch disc in the rotation axis direction.

3. The energy absorbing device according to claim 2, wherein the casing includes a plurality of partition members that partition disposed positions of the oscillation members.

4. The energy absorbing device according to claim 3, wherein each of the plurality of partition members includes a projection that partitions a disposed position of the first clutch disc and a disposed position of the second clutch disc.

5. The energy absorbing device according to claim 4, wherein the first clutch disc includes a locking section that protrudes inward in a radial direction and is disposed between the partition members, and the second clutch disc includes a locking sections that protrudes outward in a radial direction and is disposed between the partition members.

6. The energy absorbing device according to claim 1, wherein the clutch plate is disposed in the casing to be rotatable relatively to the casing, and the casing includes a cover plate that regulates movement of the clutch plate in the rotation axis direction.

7. A seat belt retractor comprising:
    a spool that retracts a webbing that restrains an occupant; and
    a base frame that rotatably holds the spool, wherein
    an energy absorbing device is disposed between the base frame or a component fixed to the base frame and the spool, and the energy absorbing device is the energy absorbing device according to claim 1.

8. A seat belt apparatus comprising:
    a webbing that restrains an occupant to a seat;
    a seat belt retractor that retracts the webbing;
    a belt anchor that fixes the webbing to a vehicle body;
    a buckle provided on a side face of the seat; and
    a tongue disposed on the webbing, wherein
    the seat belt retractor is the seat belt retractor according to claim 7.

* * * * *